United States Patent [19]
Royer

[11] Patent Number: 4,664,091
[45] Date of Patent: May 12, 1987

[54] ENGINE CONTROL

[75] Inventor: James R. Royer, Flint, Mich.

[73] Assignee: General Motors Corporation, Detroit, Mich.

[21] Appl. No.: 835,636

[22] Filed: Mar. 3, 1986

[51] Int. Cl.⁴ .............................................. F02M 51/00
[52] U.S. Cl. ...................................... 123/494; 123/255; 73/290 V
[58] Field of Search .................... 123/49 A, 1 A, 528, 123/25 A, 25 J; 73/290 V

[56] References Cited

U.S. PATENT DOCUMENTS

| | | | |
|---|---|---|---|
| 4,300,485 | 11/1981 | Goodman | 123/25 J |
| 4,392,283 | 8/1983 | Komaroff et al. | 123/49 A |
| 4,401,059 | 8/1983 | Goodman et al. | 123/25 J |
| 4,480,616 | 11/1984 | Takeda | 123/25 J |
| 4,558,665 | 12/1985 | Sandberg et al. | 123/25 J |
| 4,570,483 | 2/1986 | Sobue | 73/290 V |

Primary Examiner—Raymond A. Nelli
Attorney, Agent, or Firm—C. K. Veenstra

[57] ABSTRACT

A stream of water or a water-methanol mixture is injected into the induction passage of a spark ignition internal combustion engine, and a probe disposed in the induction passage is contacted by the stream to sense when the density of the engine charge can be increased, the air-fuel ratio of the engine charge can be leaned and the timing of ignition of the engine charge can be advanced beyond normal operating ranges.

6 Claims, 1 Drawing Figure

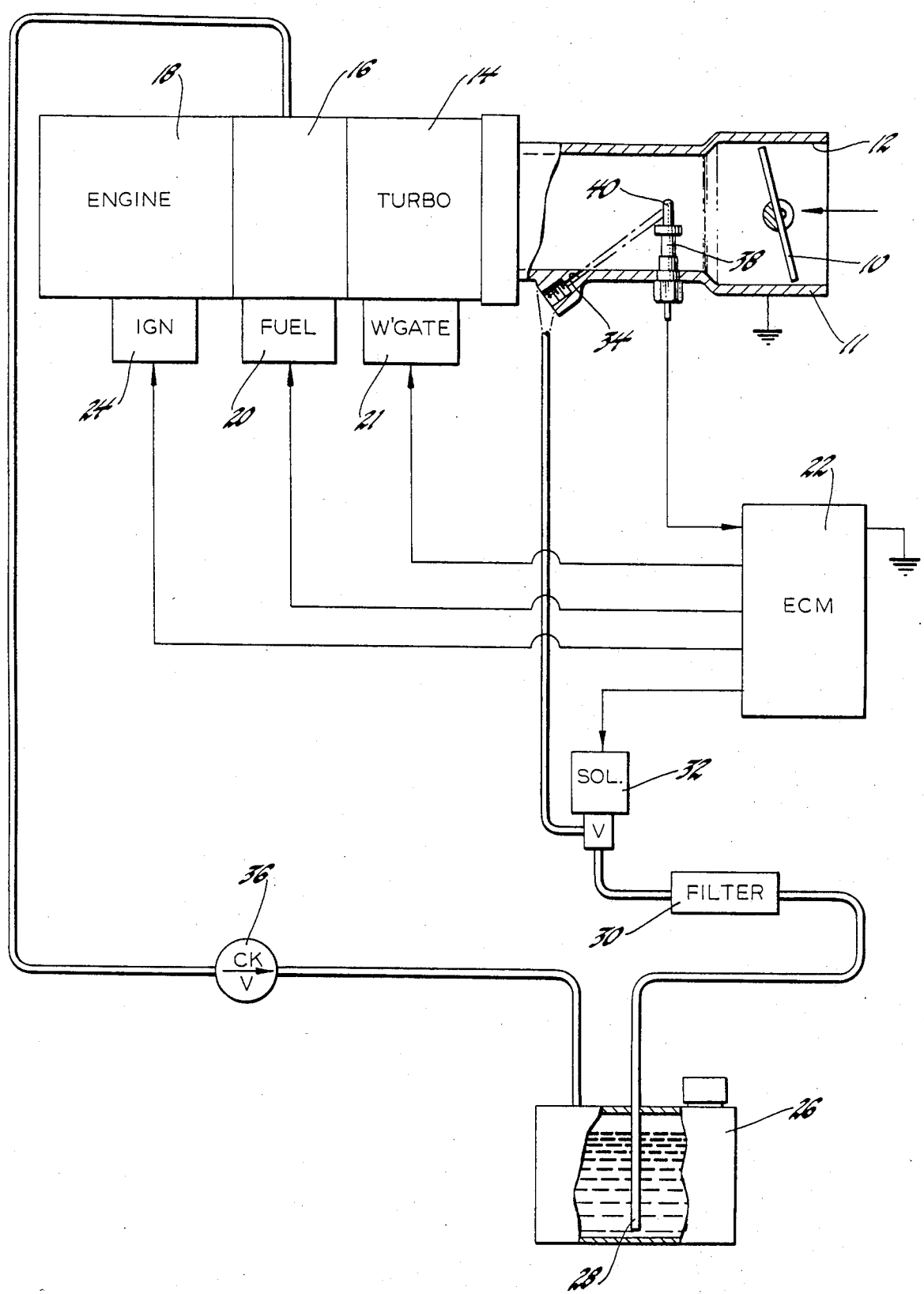

ENGINE CONTROL

TECHNICAL FIELD

This invention relates to control of an engine having a system for injecting fluid into the induction passage.

BACKGROUND

Fluids such as water and mixtures of water and methanol have been injected into the induction passages of turbo-charged and other supercharged engines to suppress detonation under high load conditions. Suppression of detonation allows an engine to operate with a charge of higher density and a leaner air-fuel ratio and with more advanced ignition timing than would be possible otherwise.

It will be appreciated, however, that an engine control system that calls for injecting a detonation suppressing fluid into the induction passage—and at the same time calls for increasing the charge density, leaning the air-fuel ratio and advancing the ignition timing—could produce adverse operating conditions if the charge density is increased, the air-fuel ratio is leaned and/or the ignition timing is advanced beyond normal operating ranges even though the fluid is not actually injected into the induction passage.

SUMMARY OF THE INVENTION

This invention provides an engine control system and method of operation that senses injection of fluid into the engine induction passage. With this invention, the engine control system increases the charge density, leans the air-fuel ratio and/or advances the ignition timing beyond otherwise normal operating ranges for the particular engine operating conditions only when the fluid is actually injected into the engine induction passage. With this invention, moreover, the engine control system limits changes in charge density, air-fuel ratio and/or ignition timing to normal operating ranges when the engine control system calls for injection of fluid into the induction passage but no fluid is injected.

In controlling an engine according to this invention, a stream of fluid is injected into the engine induction passage, and a sensor probe disposed in the induction passage produces a signal when it is contacted by the fluid stream. The sensor probe accordingly detects and indicates the actual injection of the fluid into the engine induction passage.

The details as well as other features and advantages of a preferred embodiment of this invention are set forth in the remainder of the specification and are shown in the drawing.

SUMMARY OF THE DRAWING

The sole FIGURE of the drawing is a schematic diagram of a preferred embodiment of an engine control system incorporating this invention.

THE PREFERRED EMBODIMENT

Referring to the drawing, a throttle 10 mounted in a throttle body 11 controls air flow through an induction passage 12, a turbo-charger 14 and a manifold 16 to an engine 18. A fuel system 20 is controlled by an electronic control module (ECM) 22 to deliver fuel to the engine to form an air-fuel mixture or charge, and an ignition system 24 is controlled by ECM 22 to ignite the charge.

Turbo-charger 14 increases the density of the air flow and includes a wastegate 21 that is controlled by ECM 22 to provide the desired charge density in engine 18. ECM can command turbo-charger 14 to increase the charge density above an otherwise normal operating range if a fluid such as water or a mixture of water and methanol is added to the charge. At the same time, ECM 22 can command fuel system 20 to increase or lean the air-fuel ratio of the charge beyond an otherwise normal operating range for the particular engine operating conditions and ignition system 24 to advance the time of ignition of the charge beyond an otherwise normal operating range for the particular engine operating conditions.

A reservoir 26 containing a fluid such as a mixture of water and methanol has a discharge tube 28 extending from the bottom of reservoir 26 and connected through a filter 30 and a solenoid-operated valve 32 to a jet 34 having a diameter of about 0.030 inches (about 0.76 mm). The top of reservoir 26 is connected through a check valve 36 to manifold 16. When valve 32 is open and the pressure in manifold 16 is higher than the pressure in induction passage 12 as a result of turbo-charger operation, the fluid in reservoir 26 is discharged through tube 28, filter 30 and valve 32 to jet 34, and jet 34 injects a stream of fluid at a pressure of about 10 to 15 psi (about 69 to 103 kPa) above the induction passage pressure into the air flow through induction passage 12.

ECM 22 commands valve 32 to open and permit fluid flow to jet 34 when the temperature of the coolant in engine 18 is greater than a selected value, the air flow through induction passage 12 is greater than a selected value, and the opening of throttle 10 is greater than a selected value. Even if those conditions are met and valve 32 is open, however, jet 34 would not inject a stream of fluid into induction passage 12 if reservoir 26 were empty or if the fluid flow line between tube 28 and jet 34 were plugged or disconnected. Accordingly, a sensor 38 is disposed in induction passage 12 to sense when fluid is actually injected into induction passage 12.

Sensor 38 is located about 1 to 1.5 inches (about 2.5 to 3.8 cm) from jet 34 and includes a stainless steel probe or electrode 40 connected to ECM 22. Electrode 40 is insulated from throttle body 11 and accordingly is not normally grounded. However, when a stream of fluid is injected though jet 34 into induction passage 12, the fluid stream contacts electrode 40 and grounds electrode 40 to throttle body 11. ECM 22 registers this change in the electrical state of electrode 40 as an indication that fluid is actually being injected into induction passage 12.

Sensor 38 may be similar in construction to a sensor made by Gulf +Western Manufacturing Company to sense the presence of engine coolant in a coolant overflow bottle used with an automotive engine.

When ECM 22 commands valve 32 to open and senses, through sensor 38, that fluid is actually injected into induction passage 12, ECM 22 further commands turbo-charger 14 to increase the charge density above an otherwise normal operating range, commands fuel system 20 to lean the air-fuel ratio of the charge beyond an otherwise normal operating range, and commands ignition system 24 to advance the ignition timing beyond an otherwise normal operating range.

If ECM 22 commands valve 32 to open and does not sense, through sensor 38, that fluid is actually injected into induction passage 12, ECM 22 disables the command to turbo-charger 14 to increase the charge density above an otherwise normal operating range, disables the command to fuel system 20 to lean the air-fuel ratio of the charge beyond an otherwise normal operating range, and disables the command to ignition system 24 to advance the ignition timing beyond an otherwise normal operating range.

If ECM 22 is not commanding valve 32 to open but nevertheless senses, through sensor 38, that fluid is injected into induction passage 12 for a selected period of time, ECM 22 de-energizes valve 32, disables the command to turbo-charger 14 to increase the charge density above an otherwise normal operating range, disables the command to fuel system 20 to lean the air-fuel ratio of the charge beyond an otherwise normal operating range, and disables the command to ignition system 24 to advance the ignition timing beyond an otherwise normal operating range.

The embodiments of the invention in which an exclusive property or privilege is claimed are defined as follows:

1. A control system for an engine having an induction passage through which air flows to the engine and a jet for injecting a stream of fluid into the air flowing through said induction passage, said control system comprising a probe disposed in said induction passage and contacted by said stream, said probe being adapted to produce an electrical signal when contacted by said stream.

2. The method of operating an engine having an induction passage through which air flows to the engine and a fluid sensing probe disposed in said induction passage, said probe being adapted to produce an electrical signal when contacted by a fluid stream, said method comprising the steps of injecting a stream of fluid into the air flowing through said induction passage, and causing said stream to contact said probe to effect production of said electrical signal.

3. The method of operating an engine having an induction passage through which air flows to the engine, a supercharger for increasing the density of the air flow, and a fluid sensing probe disposed in said induction passage, said probe being adapted to produce an electrical signal when contacted by a fluid stream, said method comprising the steps of injecting a stream of fluid into the air flowing through said induction passage, causing said stream to contact said probe to effect production of said electrical signal, and causing said supercharger to increase the density of the air flow above a selected level only when said probe produces said electrical signal.

4. The method of operating a spark ignition engine having an induction passage through which air flows to the engine to produce an air-fuel mixture, an ignition system for igniting the mixture, and a fluid sensing probe disposed in said induction passage, said probe being adapted to produce an electrical signal when contacted by a fluid stream, said method comprising the steps of injecting a stream of fluid into the air flowing through said induction passage, causing said stream to contact said probe to effect production of said electrical signal, and causing said ignition system to advance the timing of ignition beyond a selected amount only when said probe produces said electrical signal.

5. The method of operating an engine having an induction passage through which air flows to the engine, a fuel system for delivering fuel to the engine to produce an air-fuel mixture, and a fluid sensing probe disposed in said induction passage, said probe being adapted to produce an electrical signal when contacted by a fluid stream, said method comprising the steps of injecting a stream of fluid into the air flowing through said induction passage, causing said stream to contact said probe to effect production of said electrical signal, and causing said fuel system to deliver fuel to produce a mixture having an air-fuel ratio leaner than a selected value only when said probe produces said electrical signal.

6. The method of operating a spark ignition engine having an induction passage through which air flows to the engine, a supercharger for increasing the density of the air flow, a fuel system for delivering fuel to the engine to produce an air-fuel mixture, an ignition system for igniting the mixture, and a fluid sensing probe disposed in said induction passage, said probe being adapted to produce an electrical signal when contacted by a fluid stream, said method comprising the steps of injecting a stream of fluid into the air flowing through said induction passage, causing said stream to contact said probe to effect production of said electrical signal, causing said supercharger to increase the density of the air flow above a selected level only when said probe produces said electrical signal, causing said fuel system to deliver fuel to produce a mixture having an air-fuel ratio leaner than a selected value only when said probe produces said electrical signal, and causing said ignition system to advance the timing of ignition beyond a selected amount only when said probe produces said electrical signal.

* * * * *